June 27, 1944.   F. W. YOUNG   2,352,304
FILTER
Filed Aug. 3, 1940   2 Sheets-Sheet 2

INVENTOR.
FRANK W. YOUNG
BY Orton and Griswold
ATTORNEY.

Patented June 27, 1944

2,352,304

UNITED STATES PATENT OFFICE 2,352,304

FILTER

Frank W. Young, Upper Montclair, N. J.

Application August 3, 1940, Serial No. 350,286

6 Claims. (Cl. 210—199)

This invention relates to methods and apparatus for washing solids recovered from liquids in which they have been suspended and particularly to solids of a chemical nature which renders recovery difficult due to foaming, for instance, of the filtrate.

In the washing of brown stock (caustic sulphate wood pulp) in kraft mills, it is necessary at the present time, after the wood has been digested in the caustic liquid, to wash the resulting pulp free of the caustic liquor, resin and other impurities that have been disassociated by the digesting process. For reasons of economy, it is of advantage to recover the major portion of the caustic liquor for reuse. This has heretofore been done by washing the pulp in diffusers or wash pans and has required large and expensive equipment and considerable labor because of the large quantity of foaming liquid present. More recently, the pulp has been washed on continuous filters by countercurrent washing using, for instance, two filters for two stage countercurrent washing, three filters for three stage countercurrent washing, and so on. The latter method of washing reduces labor and decreases the loss of caustic but the handling and rehandling of the pulp and liquors in each washing stage causes considerable and very troublesome foam. Because of this foam, the pumps, tanks and other equipment in the system as a whole are vented into a plurality of foam tanks or traps, many of these being needed and much space being occupied.

One object of the present invention is to perform multi-stage countercurrent washing of "Brown Stock" on a single filter.

Another object of the invention is to avoid repulping between washing stages.

A further object of the invention is to reduce to a minimum the amount of foam produced and accumulated in the recovered liquor which is the filtrate.

In carrying the invention into effect, it is preferred to utilize a filter such as shown in copending application Serial No. 232,509 filed September 30, 1938. All accessory equipment used with the filter or series of filters is hermetically sealed, the gaseous medium removed from the filter being returned to the filter for use in cake discharge.

It is a further object of the invention to utilize all the gaseous medium withdrawn from the filter in the filtering operation by returning it to the filter for cake discharge and during the course of its return under pressure to utilize it.

The invention also seeks a method, and apparatus for carrying out the method, which is practical from the standpoint of ease and cheapness of installation and practicability in use.

These and other objects of the invention and the means for their attainment will be more apparent from the following detailed description taken in connection with the accompanying drawings illustrating one embodiment by which the invention may be realized and in which.

Figure 2:
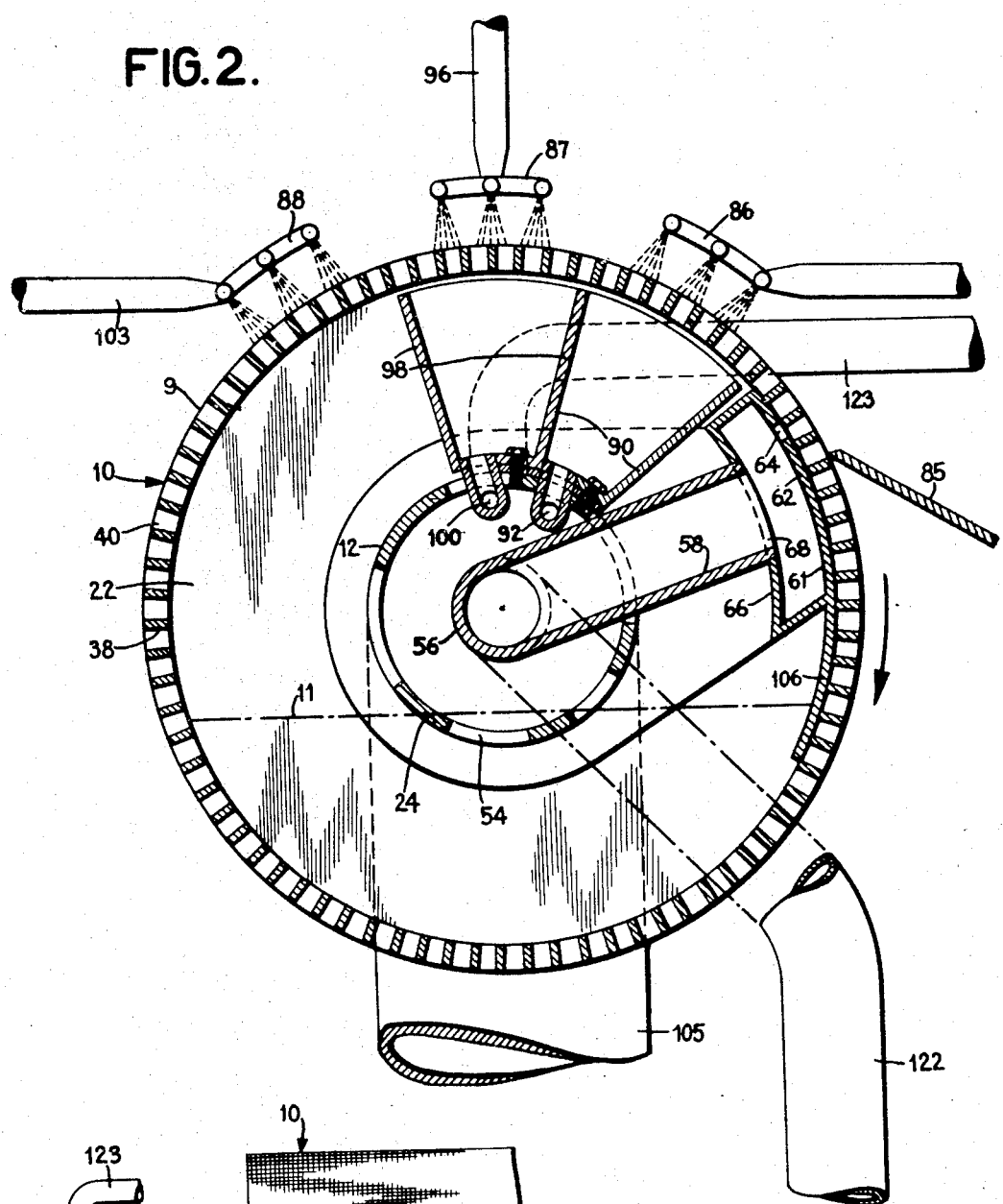
Figure 2 is a view, on an enlarged scale, showing a filter by which multi-stage washing in accordance with the process of this invention may be performed.

Referring first to Figure 2, the continuous filter of this invention is shown as comprising a filter drum 10 rotatably mounted on an axially extending cylindrical bearing member 12. This cylindrical bearing member 12 is shown as taking the form of a tube.

The filter drum 10 is shown as formed by a pair of spaced discs 22 centrally apertured, as at 24, to receive the cylindrical bearing 12.

The circumferential surface of the drum is formed by a cylindrical member 38—40 which may be composed of more than one part or as an integral cylinder and is formed with a plurality of closely spaced filtrate passages 40 defined by wall portions 38. Filtering medium 9 overlies the surface of the drum and is supported by the shell 38.

Figure 1:
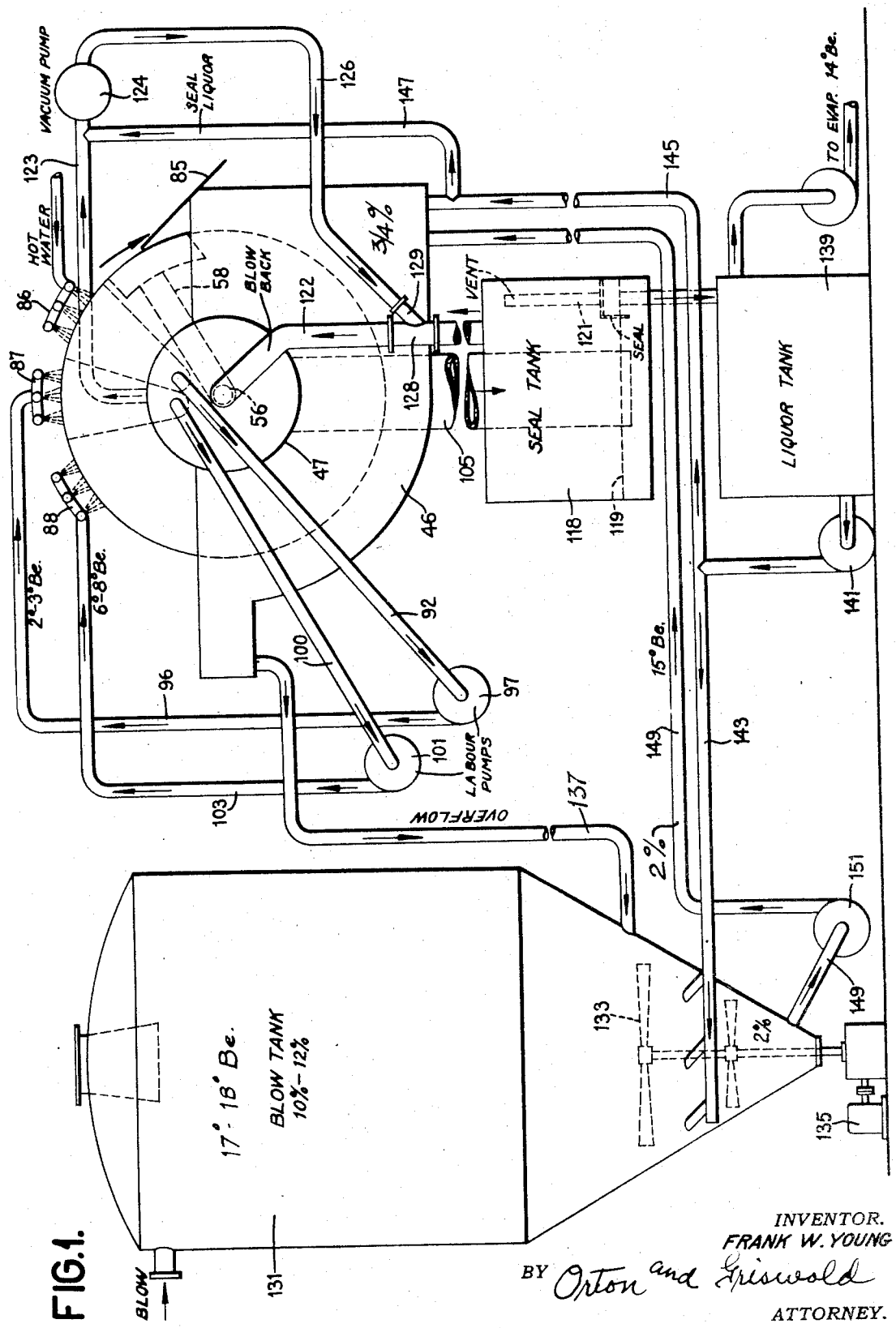
Figure 1 is a somewhat schematic view showing the apparatus of this invention.

The filter drum rotates in the filter tank 46, Figure 1, through which the cylindrical bearing member 12 passes and the filter tank 46 is open to the atmosphere. The opening 47 through which the trunnion 12 passes to the outside of the tank is sealed.

The filter may be rotated in any convenient manner.

Inwardly of the filter drum, the cylindrical bearing is formed with a plurality of filtrate passages 54 whereby fluid from the interior of the filter drum may enter the cylindrical bearing for evacuation from the drum. The total area of passages 54 are greater than the internal cross-sectional area of bearing tube 12 so that filtrate from the interior of the drum has unobstructed access to tube 12 in volume up to the carrying capacity of tube 12. During operation, the minimum level of the liquid inside the drum will never be lower than the lowest passage 54 because the liquid flows out by gravity. As is well known, during operation as a vacuum filter, the level of the liquid inside the drum will not be higher than the highest passage 54 because, in order to maintain vacuum in the drum, air must be evacuated through tube 12 and cannot be so evacuated should all outlets be submerged. The structure here described is shown, described and claimed in my copending application Serial Number 291,083 filed August 19, 1939.

It is proposed, in accordance with one aspect of the invention, to remove the filtered material from the surface of the filter drum by a pressure differential upon opposite faces thereof. Specifically, it is proposed to force fluid i. e., gaseous medium such as air, from the drum by a vacuum pump outwardly through the filtration passages 40, formed in the drum periphery. To this end, a conduit, such as the pipe 56, adapted to conduct air or other fluid medium under pressure, is disposed axially of the cylindrical bearing 12 and an elbow or bent extremity 58 on the end thereof terminates within the drum interior.

In the illustrated embodiment, a shoe or box receives the gaseous medium under pressure from this conduit 56, 58. As shown, the outer wall 62 (Figure 2) of the shoe is provided with an aperture 64 of a size to register with and be preferably coextensive with one of the passages 40 in the drum periphery. The inner box wall 66 opposite the aperture 64 is formed with a tubular passage 68 to receive the fluid from the conduit end 58.

The filter drum is applicable for use in either high or low submergence operation. Proper operation of the filter of this invention is dependent upon internal submergence of the lower end of the box or shield 61 in the liquid or filtrate in the drum. Figure 2 shows a filter, in which, the level of the filtrate 11 in the drum is below the center line of the filter and the shield 61, 106 extends from ahead of cake discharge 64 to a point beyond the liquid level 11.

As the drum rotates, filter cake on the surface thereof is lifted off the surface by the pressure of the fluid passing through the apertures 64 and 40 so that it is separated from the filtering medium on the drum and carried away by the doctor blade 85.

To wash the filter cake, nozzles 86, 87, 88 may be mounted, in known manner, in spaced relation to the filter medium on the filter drum 10. The wash liquid falling, say, from a nozzle 86 ahead of the point where the cake leaves the drum, passes through the filter cake on that segment of the drum periphery and enters a pan 90 mounted therebeneath. An outlet pipe 92 from the pan 90 passes through one of the filtrate passages 54 in the wall of the cylindrical bearing member 12 and from thence is conducted to pump 97. The weak wash liquor may then be pumped as by pump 97 through pipe 96 to nozzles 87 and pass through the filter cake into pan 98 from whence it is drawn through outlet pipe 100 which stronger wash liquor may be pumped as by the pump 101 through pipe 103 to nozzles 88. The wash liquor from nozzles 88 passes through the filter cake and into the interior of the drum where it mixes with the filtrate and is evacuated by pipe 12. This description is of a three stage countercurrent washing and to those versed in the art is known to be regularly accomplished by using three filters. Due to the novel construction of this filter, unlimited stages of countercurrent washing may be accomplished on a single filter.

Of course, the capability of this filter for single stage or multi-stage washing is self-evident. Obviously, as many or as few pans may be used as desired for the purpose at hand.

The pans 90, 98 are preferably carried by the tube 12 and are supported in adjusted relation to the surface of the filter drum.

In the illustrated embodiment, the subatmospheric pressure in the filter drum is created through the instrumentality of the vacuum pump 124.

A barometric leg is used, as at 105, for evacuating the liquid. Some air drawn through the filter medium is carried down with the liquid in the barometric leg and into the closed tank 118, where the air and liquid separate, the liquid flowing out of the closed tank 118 through the pipe 120 which traps the air under pressure in the closed seal tank 118 and controls the pressure of air according to the height of the outlet 120 controlling the level 119 of the liquid in the tank 118.

The air is accumulated in the upper part of tank 118 at the pressure produced therein and is allowed free flow through pipe lines 122 into the blow-back pipe 56 leading to the air box 61—68. Thus the volume of air and the pressure thereof produced in the closed tank 118 can be utilized in the air box 61—68 to discharge the filter cake.

Figure 3:
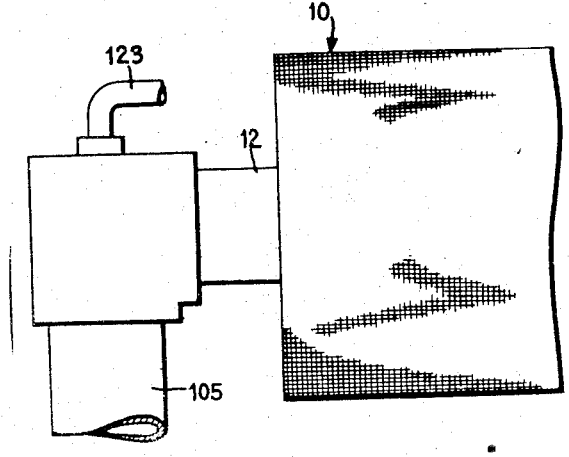
Figure 3 is a fragmentary view showing the upper end of the barometric leg and the connection to the vacuum pump.

The air travelling upwardly in the pipe 122 carries with it relatively small quantities of foam. This foam interferes materially with the operation of the filter and accumulation of filtrate for reuse. To reduce or destroy this foam and prevent the entrance of the foam into the blow-back pipe 56, gaseous medium under pressure is introduced into the pipe 122 at a suitable point between the seal tank 118 and the filter or pipe 56 therein. This gaseous medium is conveniently obtained from the filter drum by a vacuum pump and used in a closed cycle. As shown in Figure 3, the tube 12 at one side of the filter drum 10 terminates in a T fitting, from one end of which the barometric leg 105 extends. From the upper end of the T fitting, a conduit 123 leads to a vacuum pump 124 which constantly draws fluid (air) evacuated from the drum 10 and forces it through a conduit 126 back to the pipe 122. Preferably this air is forced into the pipe 122 in a downward direction and to this end the pipe 122 is shown as provided with a Y fitting 128 to the upwardly extending branch 129 of which the conduit is connected. The air under pressure entering the pipe 122 at this point disrupts the bubbles of foam in the air forced up from the tank 118 and causes the liquid of the bubbles to fall back down the pipe 122 into the seal tank whereby substantially only air may rise above the fitting 128 to enter the blow-back pipe 56.

The caustic sulphate wood pulp is delivered into the blow tank 131 where it settles to the bottom and is agitated by the agitator 133 driven by motor 135. Overflow pulp from the filter tank 46 is also conducted to the blow tank 131 by conduit 137. Caustic liquor from liquor tank 139, which has been delivered thereto from seal tank 118 is pumped by pump 141 through conduit 143 to the blow tank 131 to dilute the pulp therein. Liquor is also delivered by pump 141 through conduit 145 to the filter tank 46 to further dilute the pulp and through a branch conduit 147 and conduit 123 as sealing liquor for the pump. The caustic pulp partially diluted is withdrawn through conduit 149 from the blow tank by pump 151 and delivered to the filter tank 46. The various percentages on the drawings show the dilution of the pulp. The indications of the strength of the caustic liquor are indicated on the drawings at the different points in degrees Baumé.

The entire system illustrated in Figure 1 is hermetically sealed whereby no outside air may leave the system except through the filter medium at the point of cake discharge. The air enters the filter drum during the washing and dewatering period. This air is sucked out by the vacuum pump. The discharge of the vacuum pump is returned to the system and used for discharging the filter cake or pulp sheet. Some air may be entrained with the liquid taken down the barometric seal leg. This is liberated in the seal tank and returns with the other blow-back air. Some air may be entrained with the liquid taken out by pumps 97 and 101. This is returned to the filter with the wash liquor and liberated from the wash sprays 86, 87 and 88. The liquor for reuse in filtration and that sent to the evaporator is collected, free of air, in the closed liquor tank 139. The small amount of foam (bubbles) that may form in the seal tank is knocked down at 128 by the pressure from the discharge of the vacuum pump so that no foam, tanks or traps are required.

Various modifications will occur to those skilled in the art in the composition, configuration and disposition of the component elements going to make up the invention as a whole as well as in the use of selected elements in given situations and no limitation is intended by the phraseology of the foregoing description or illustrations in the accompanying drawings except as indicated in the appended claims.

What is claimed is:

1. The method of preventing the accumulation of foam on the surface of the liquid evacuated from a filter which comprises subjecting the liquid and gas to pressure produced by introducing all the gaseous medium removed from the interior of the filter into an enclosure and returning all the gaseous medium through said enclosure to the filter for use in cake discharge.

2. In a device of the character described, in combination, a rotary drum filter, means to selectively deliver washing fluid to predetermined areas of filter cake adjacent the external surface of the drum, means to selectively receive and return the washing fluid from one said area to a different said area, means to separately evacuate liquid and gaseous medium from the drum interior, means to further separate the gaseous medium under pressure from the fluid and return said separated gaseous medium under pressure to a predetermined area of that surface of the filter cake adjacent the external drum surface to discharge the filter cake therefrom and means to seal said last mentioned predetermined area on the interior of the drum surface against the subatmospheric pressure in the drum to permit the said discharge of the said filter cake.

3. In a device of the character described, in combination, a rotary drum filter, means to selectively deliver washing fluid to the external drum surface, means within the drum to receive fluid from the respective spray nozzles, conduits to evacuate liquid from the respective pans to the respective nozzles, a barometric leg to evacuate liquid and gaseous medium from the drum interior, means to further separate the gaseous medium under pressure from the fluid, means to return said separated gaseous medium to a predetermined external area of that surface of the filter cake adjacent the drum surface to discharge the filter cake therefrom comprising a barometric leg, a tank into which the barometric leg enters and which is sealed against the escape of gaseous medium, a vacuum pump in communicating connection with the barometric leg at a point proximate the filter and means to deliver gaseous medium from the pump to said means returning the gaseous medium returning means, and means to seal said last mentioned predetermined area on the interior of the drum surface against the subatmospheric pressure in the drum to permit the said discharge of the said filter cake.

4. In a multi-stage washing of brown stock, in combination, a continuous filter, barometric means to create subatmospheric pressure in the filter, gaseous pressure cake discharge means, means to separate gaseous medium and the foam created thereby from the barometric means, means to deliver said separated gaseous medium and entrained foam to the cake discharge means, means to conduct gaseous medium from the barometric means to the last named means to break down the entrained foam and thereby to prevent foam returning to the filter.

5. In the multi-stage counter-current washing of brown stock, in combination, a rotary drum filter, a pump to evacuate gaseous medium and the foam created thereby from the filter, a barometric leg evacuating liquid and entrained gaseous medium from the drum interior, a closed tank into which the barometric leg empties and in which the gaseous medium separates from the liquid and is placed under pressure, a conduit to deliver the gaseous medium under pressure from the tank to the inner surface of the filter cake on the filter drum to discharge cake therefrom, a conduit connecting the pump with the upper portion of the barometric leg and a conduit leading from the pump to the first named conduit to deliver fluid evacuated from the drum to the gaseous medium delivery conduit to break down foam rising in the conduit from the closed tank therein.

6. The method of preventing the return of foam to a filter which comprises returning all of the gaseous medium removed from the interior of the filter to the interior of the filter for use in cake discharge and during such return, utilizing a portion of the gaseous medium during its return to the interior of the filter to break down foam in the returning gaseous medium.

FRANK W. YOUNG.